(12) United States Patent  
Auracher et al.

(10) Patent No.: US 7,117,472 B2
(45) Date of Patent: Oct. 3, 2006

(54) PLACEMENT OF A CLOCK SIGNAL SUPPLY NETWORK DURING DESIGN OF INTEGRATED CIRCUITS

(75) Inventors: Stefan G. Auracher, Baierbrunn (DE); Claus Pribbernow, Munich (DE); Andreas Hils, Unterhaching (DE); Juergen Dirks, Holzkirchen (DE); Manisha R. Patel, Milpitas, CA (US); James T. Imper, Mountain View, CA (US)

(73) Assignee: LSI Logic Corporation, Milpitas, CA (US)

( * ) Notice: Subject to any disclaimer, the term of this patent is extended or adjusted under 35 U.S.C. 154(b) by 53 days.

(21) Appl. No.: 10/887,599

(22) Filed: Jul. 9, 2004

(65) Prior Publication Data

US 2006/0010408 A1 Jan. 12, 2006

(51) Int. Cl.
*G06F 17/50* (2006.01)
(52) U.S. Cl. ............... 716/13; 716/1; 716/6; 716/8; 716/12
(58) Field of Classification Search ............ 716/13, 716/1, 6, 8, 12
See application file for complete search history.

(56) References Cited

U.S. PATENT DOCUMENTS 5,923,188 A * 7/1999 Kametani et al. ........... 326/93
6,127,865 A * 10/2000 Jefferson .................... 327/149
6,552,410 B1   4/2003 Eaton et al.
6,594,772 B1 * 7/2003 Tsai et al. ................... 713/500
6,897,699 B1 * 5/2005 Nguyen et al. ............. 327/295
6,943,610 B1 * 9/2005 Saint-Laurent ............. 327/295
2002/0066065 A1 * 5/2002 Baumgartner et al. ........ 716/6
2003/0051222 A1 * 3/2003 Williams et al. ............ 716/12
2003/0149943 A1 * 8/2003 Yoshikawa ................... 716/1
2004/0243957 A1 * 12/2004 Mandry ....................... 716/6
2005/0010884 A1 * 1/2005 Lu et al. ...................... 716/6
2005/0050497 A1 * 3/2005 Tetelbaum ................... 716/6
2006/0075180 A1 * 4/2006 Tian et al. .................... 711/1

* cited by examiner

*Primary Examiner*—A. M. Thompson
*Assistant Examiner*—Suchin Parihar
(74) *Attorney, Agent, or Firm*—Christopher P. Maiorana (57) ABSTRACT

A method of placing a clock signal supply network in a design representation for an integrated circuit. The design representation may comprise a plurality of clockable circuit cells. The method may comprise identifying a first of the clockable circuit cells in the design representation. The method may further comprise identifying a second of the clockable circuit cells in the design representation. The second clockable circuit cell may have a clock timing dependent relation relative to the first clockable circuit cell. The method may further comprise configuring the clock signal supply network. The clock signal supply network may be configured to supply respective clock signals to the first and said second clockable circuit cells. The clock signal supply network may be configured to route the respective clock signals such that a timing difference between the respective clock signals is protected from process, voltage and temperature (PVT) influences.

20 Claims, 9 Drawing Sheets

PLACEMENT OF A CLOCK SIGNAL SUPPLY NETWORK DURING DESIGN OF INTEGRATED CIRCUITS

FIELD OF THE INVENTION

The present invention may relate to a method, apparatus and/or design tool for placing a clock signal supply network during the design of an integrated circuit. The invention may especially relate to an automated technique for placing such a network.

BACKGROUND TO THE INVENTION

One of the steps of designing an integrated circuit layout is to arrange for clock signals to be supplied to clocked cells of the circuit. A computer based design tool is used to automatically design a clock signal supply network (clock tree) according to predetermined design rules. The clock tree has multiple branches to deliver clock signals to different circuit cells, at different locations, on an integrated circuit die. The branches typically include active circuit cells through which the clock signal passes. Typical active cells include repeater cells for preserving the clock signal in long signal paths, and clock gate cells for selectively blocking or applying the clock signal. In a balanced clock tree, the branches are designed to have generally the same signal path length in each branch in an attempt to reduce clock skew between the branches.

Controlling clock skew is an important part of the design process. Clock skew affects the relative timing at which different cells in the integrated circuit operate. Clock skew can be a limiting factor on the maximum operating speed of one or more parts of the integrated circuit or the integrated circuit as a whole. In practice, undesirable clock skew between two or more branches of a clock tree remains a significant design problem. The problem is becoming increasingly apparent as greater demands are made on speed, performance, complexity and fabrication size and density of integrated circuits. Current automatic design tools for placing clock trees lack sufficient refinement for optimizing clock trees in demanding or speed critical designs.

SUMMARY OF THE INVENTION

The present invention may relate to a method of placing a clock signal supply network in a design representation for an integrated circuit. The design representation may comprise a plurality of clockable circuit cells. The method may comprise identifying a first of the clockable circuit cells in the design representation. The method may further comprise identifying a second of the clockable circuit cells in the design representation. The second clockable circuit cell may have a clock timing dependent relation relative to the first clockable circuit cell. The method may further comprise configuring the clock signal supply network. The clock signal supply network may be configured to supply respective clock signals to the first and said second clockable circuit cells. The clock signal supply network may be configured to route the respective clock signals such that a timing difference between the respective clock signals is protected from process, voltage and temperature (PVT) influences.

Advantages, features and objects of the invention may include: (i) reducing a vulnerability of a circuit to clock skew induced by PVT characteristics; (ii) designing and/or placing a clock signal supply network based on a functional relationship between clocked cells; (iii) designing and/or placing a clock signal supply network based on an interconnectivity of clocked cells; (iv) designing and/or placing a clock signal supply network based on closely dependent timing relationships between cells; (iv) reducing (e.g., minimizing) a number of elements in clock paths to certain clocked cells; (v) increasing (e.g., maximizing) a common trunk portion of a clock supply network for driving certain clocked cells; and/or (vi) placing different clock paths physically close to each other to reduce PVT induced skew between the clock signals in the different clock paths. Other features, objects and advantages of the invention will become apparent from the following description, claims and/or drawings.

BRIEF DESCRIPTION OF THE DRAWINGS

Non-limiting preferred embodiments of the invention are now described, by way of example only, with reference to the claims and the accompanying drawings, in which:

DETAILED DESCRIPTION OF PREFERRED EMBODIMENTS

Figure 1:
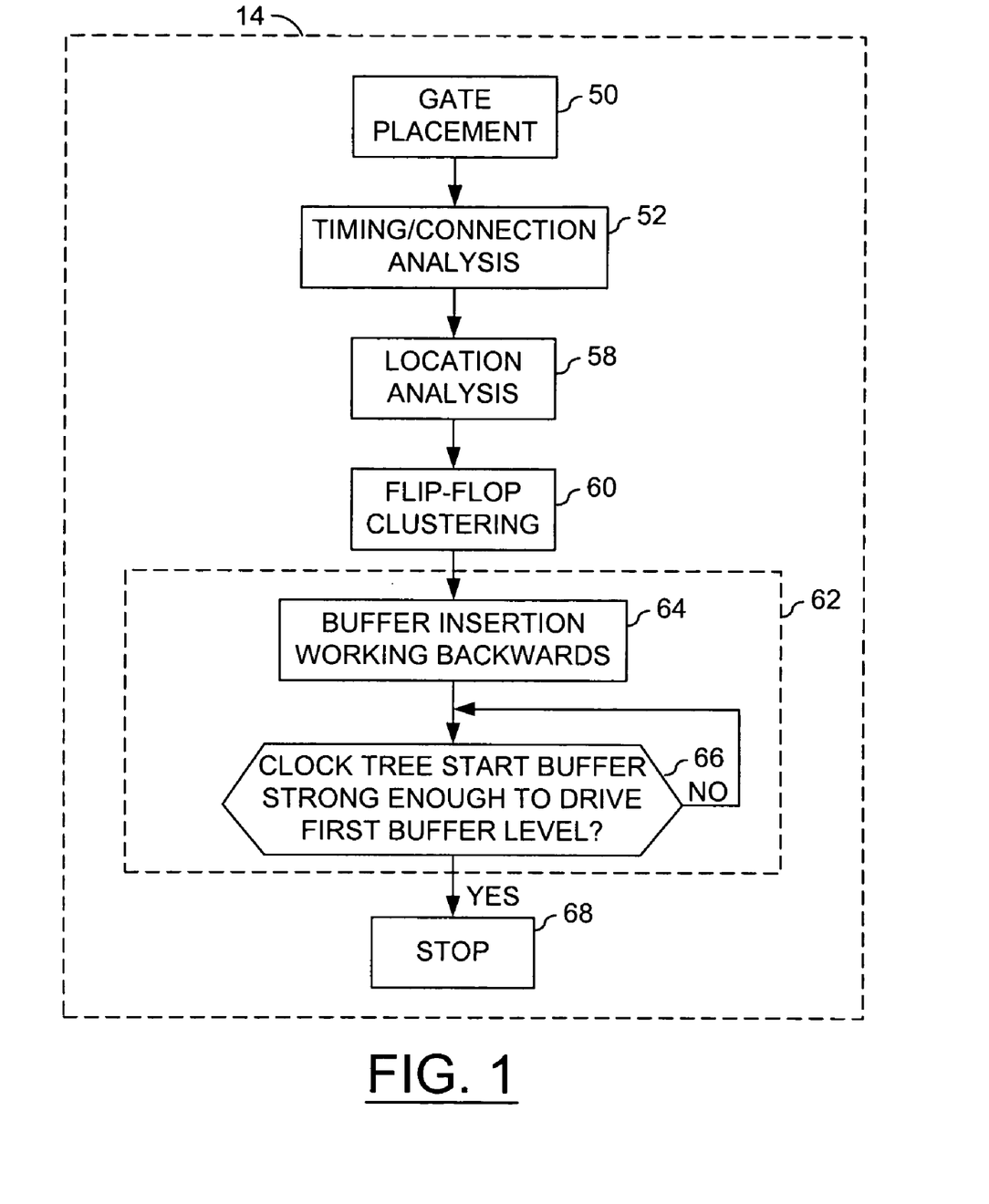
FIG. 1 is a flow diagram showing steps for placing a clock signal supply network using a design tool of a preferred embodiment of the invention.

FIG. 1 may illustrate execution steps used in a design tool (e.g., clock placement tool) 14 of a preferred embodiment of the invention. The design tool 14 may be configured to design a clock signal supply network (e.g., a clock tree) for a first circuit layout (e.g., circuit 10 in FIG. 2) for an integrated circuit 12. The design tool 14 may be computer-based. The steps may be executed on and/or by a computer. The design tool 14 may be configured to provide a balanced and/or optimized clock tree for demanding and/or speed critical circuits. The design tool 14 may take account of one or more of process, voltage and temperature (PVT) characteristics. The design tool 14 may route the clock signals to certain cells, so as to protect a relative timing of the clock signals from PVT characteristics. PVT characteristics may affect the speed and/or timing of circuitry at different locations within an integrated circuit 12. PVT characteristics may affect the speed at which circuit elements (e.g., active circuit elements) may operate. For example, PVT characteristics may affect the operating speed of repeater cells (78 described later) used in a clock tree. PVT characteristics may introduce clock skew when the PVT characteristics may be different in different branches of the clock tree and/or when the PVT characteristics affect different branches of the clock tree differently. The manner in which PVT characteristics may affect different branches of a clock tree may be difficult to control and/or predict.

Process characteristics may include minor processing variations that may occur during fabrication of the integrated circuit 12. Minor processing variations may occur between different integrated circuits 12, or at different locations within an integrated circuit 12. Minor processing variations may, for example, include a doping level or gradient. Voltage characteristics may include voltage drops occurring while the integrated circuit 12 is in use, or an allowable voltage range over which the integrated circuit 12 may be specified for use. Temperature characteristics may include an allowable operating temperature range for the integrated circuit as a whole, or hot-spots generated at localized areas of the integrated circuit, creating a temperature gradient. The voltage and/or the temperature characteristics may vary dynamically when the integrated circuit is in use.

The design tool 14 may be configured to place a clock tree to reduce a vulnerability to PVT induced clock skew for at least certain cells. The design tool 14 may take into account the connectivity and/or timing paths of cells. The design tool 14 may design a clock tree such that cells having a closely dependent timing are supplied with a clock signal from the same portion (e.g., branch) of the clock tree as one another.

Figure 2:
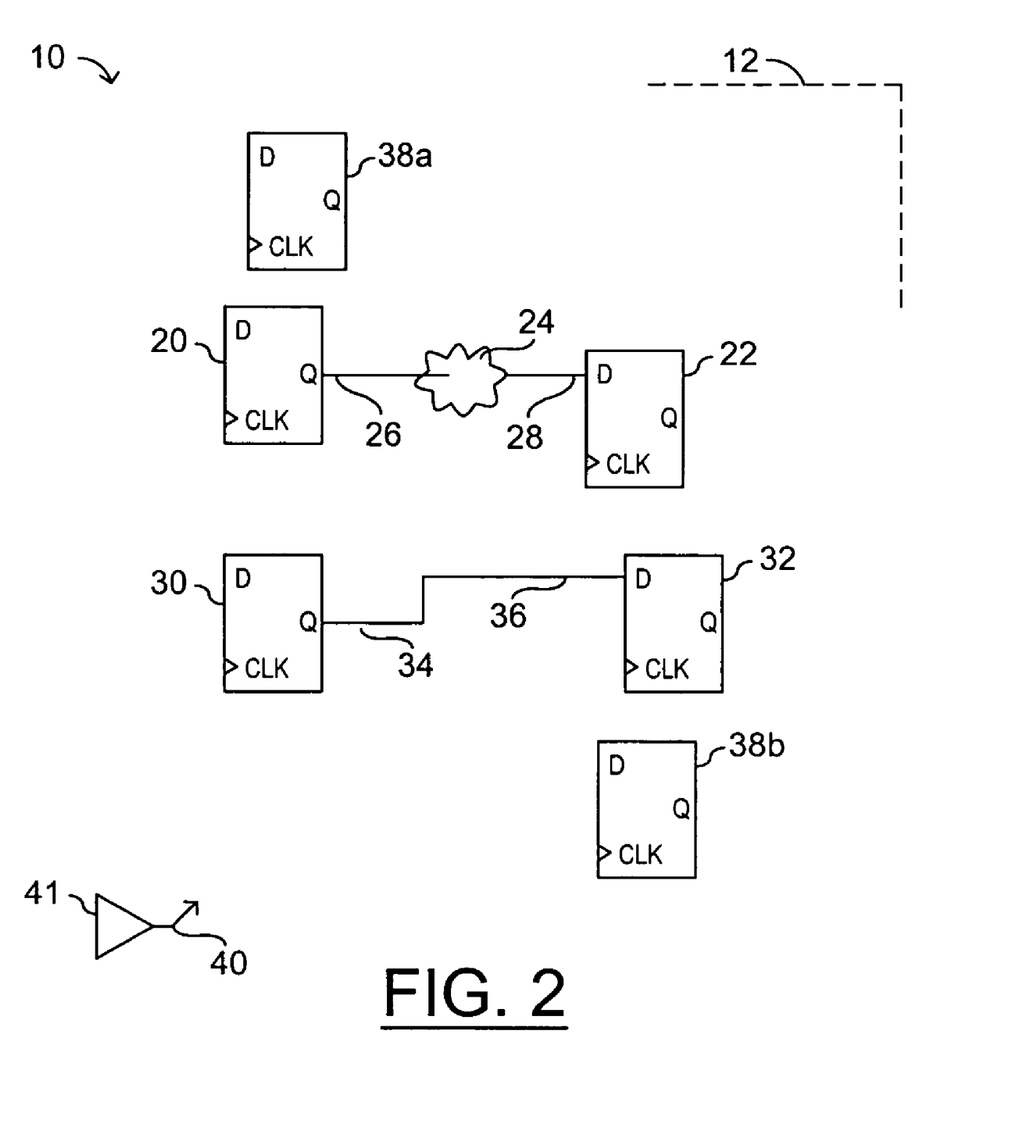
FIG. 2 is a schematic circuit diagram illustrating parts of a design of a first integrated circuit for which a clock signal supply network is to be prepared.

FIG. 2 may illustrate an example portion of a design of a circuit 10 for the integrated circuit 12, for which a clock tree (not shown in FIG. 2) is to be designed by the design tool 14. The integrated circuit 12 may, for example, be an Application Specific Integrated Circuit (ASIC). The circuit 10 is merely an example to illustrate the operation of the design tool 14. Other circuits may include different functional circuit cells and/or interconnections according to specific design criteria.

The circuit 10 may include a clocked cell 20 at a first location, and a downstream clocked cell 22 at a second location. An output signal 26 from the clocked cell 20 may be coupled to an input 28 of the downstream clocked cell 22. The output signal 26 may be coupled to the input 28 via combinatorial logic 24. The circuit 10 may additionally or alternatively include a clocked cell 30 at a third location, and a downstream clocked cell 32 at a fourth location. An output signal 34 from the clocked cell 30 may be coupled to an input 36 of the downstream clocked cell 32. The output signal 34 may be coupled directly to the input 36. The first location may be near or at the third location. The second location may be near or at the fourth location. The circuit 10 may additionally include one or more other clocked cells 38 (e.g., 38a and 38b) near the first to fourth locations. The circuit 10 may include other functional connections, but only certain timing critical interconnections for the portion of the circuit 10 are illustrated in FIG. 1.

The clocked cells 20, 22, 30, 32 and 38 may be any type of circuit having an input (e.g., CLK) for receiving a clock signal for triggering and/or clocking and/or controlling the timing of the cell. For example, one or more of the clocked cells 20, 22, 30, 32 and 38 may be a flip flop. The clocked cells 20, 22, 30, 32 and 38 may be clocked by a clock signal 40 derived from a common clock source 41, and supplied by a clock tree to be designed.

Figure 3:
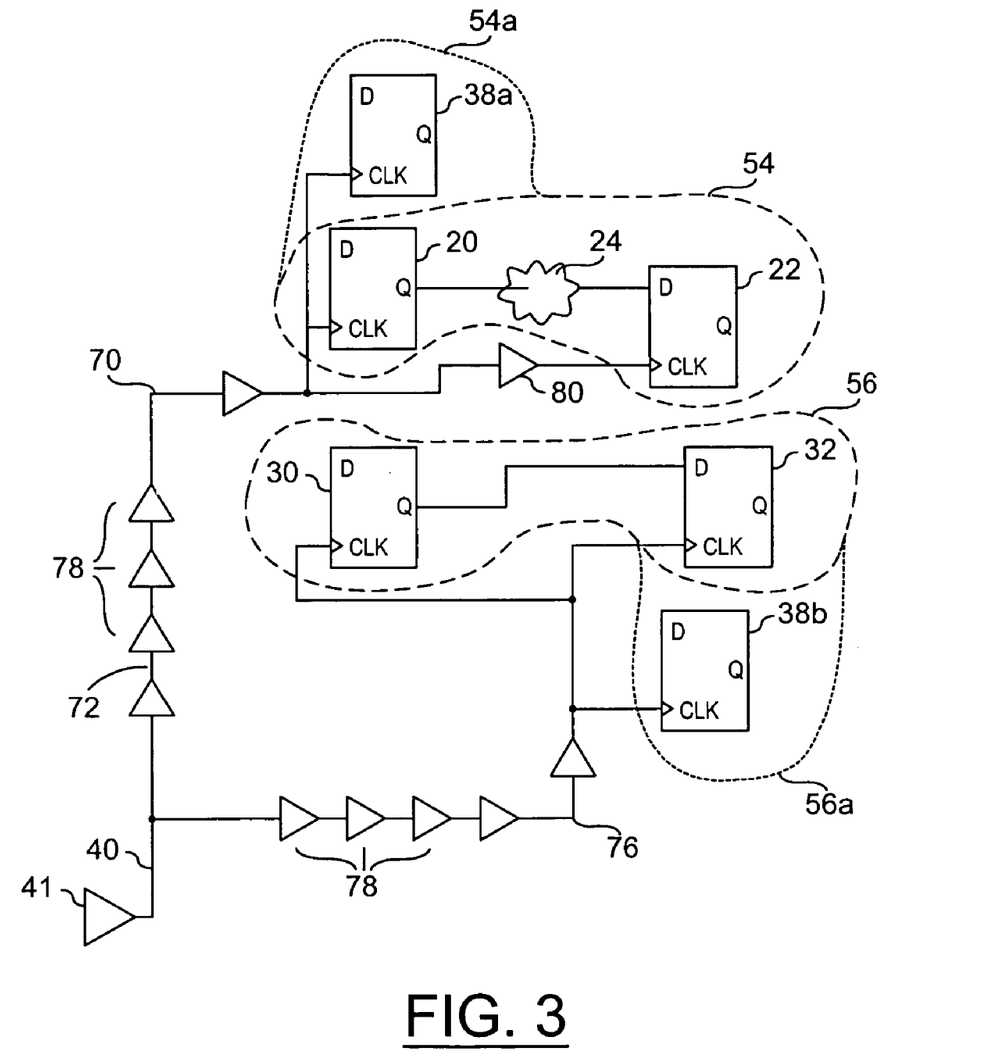
FIG. 3 is a schematic circuit diagram similar to FIG. 2, and including a clock tree designed using the design tool of FIG. 1.

Referring to FIGS. 1, 2 and 3, the design steps may include a step 50 at which the cells (e.g., 20, 22, 30, 32 and 38) are placed in the physical layout of the integrated circuit 12. The step 50 may be carried out previously as part of a different design process, or it may be conducted by the design tool 14. At a next step 52, the tool 14 may perform a first analysis to identify one or more clusters of cells that have a closely dependent timing. A closely dependent timing may be determined for cells when a timing of one cell (e.g., 20 or 30) may affect the timing of a downstream cell (e.g., 22 or 32) that receives a signal derived from the one cell. The step 52 may be performed by analysing the connectivity of cells and/or analysing a relative timing relationship amongst the cells. Additionally or alternatively, a user or designer may specify specific cells that may be in a timing critical or speed critical path. The step 52 may define clusters based on such user or designer specified information.

For the circuit 10, the step 52 may identify a cluster 54. The cluster 54 may comprise the cell 20 and the downstream cell 22. The cluster 54 may be identified because the timing of the downstream cell 22 may be dependent on the timing of the cell 20 (e.g., with a delay as a result of the combinatorial logic 24). The step 52 may additionally or alternatively identify a cluster 56. The cluster 56 may comprise the cell 30 and the downstream cell 32. The cluster 56 may be identified because the timing of the downstream cell 32 may be directly dependent on the timing of the cell 30.

At a next step 58, the tool 14 may perform a second analysis to identify other cells 38 (e.g. 38a and 38b) that may be located near the clusters 54 and 56. At a next step 60, the clusters 54 and 56 may be expanded to include not only the cells having a closely dependent timing, but also the other cells 38 nearby. For example, the cluster 54 may be expanded (at 54a) to include the cell 38a, and the cluster 56 may be expanded (at 56a) to include the cell 38b.

At a next step 62, a clock tree 72 may be generated for supplying one or more clock signals to each cluster 54 and 56. The clock signals may originate from the clock signal source 41. The clock signal source 41 may, for example, comprise a driver or buffer for applying the clock signal. For example, a branch 70 of the clock tree 72 may be generated for supplying the clock signal from the clock signal source 41 to the cluster 54 and/or the expanded cluster 54a. Also for example, a branch 76 of the clock tree 72 may be generated for supplying the clock signal from the clock signal source 41 to the cluster 56 and/or the expanded cluster 56a. The step 62 may be performed separately for each cluster, or for a plurality of the clusters in combination as a group. The step 62 may comprise recursive sub-steps 64 and 66. The sub-step 64 may comprise inserting a repeater cell 78 in a respective branch of the clock tree 72, working backwards from the or each respective cluster 54, 56 towards the clock signal source 41. The repeater cell 78 may include one or more circuit elements, for example, active circuit elements. The repeater cell 78 may typically be an inverter and/or a buffer. The sub-step 66 may comprise determining whether or not the clock signal source 41 is sufficiently powerful to drive the last-inserted repeater cell 78 without risking a loss in the level (e.g., voltage level) and/or timing (e.g., slew rate) of the clock signal 40. When at the sub-step 66 it is determined that the clock signal source 41 is not sufficiently powerful, the process may loop back to the sub-step 64 for inserting another repeater cell 78 in the or each branch. When at the sub-step 66 it is determined that the clock signal source 41 is sufficiently powerful, the process may terminate (e.g., at a step 68).

The sub-step 64 may also comprise inserting a delay compensation cell 80 into one or more of the branches 70 and 76 to compensate for signal delays between an upstream cell and a downstream cell. For example, the delay compensation cell 80 may be inserted in the branch 70 between the cell 20 and the downstream cell 22, in order to compensate for a propagation delay of the combinatorial logic 24. The propagation delay may be a time duration taken by the output signal 26 propagating through the combinatorial logic 24 to the input 28 of the downstream cell 22.

A feature of the clock tree 72 designed by the design tool 14 may be that cells (e.g., 20 and 22; 30 and 32) that have a closely dependent timing, may be supplied by substantially the same branch or portion of the clock tree. Using the same branch of the clock tree may optimize the timing of a clock signal for driving the closely dependent cells, and reduce the risk of clock skew caused by PVT differences affecting different clock tree branches. A clock signal supplied to different cells via the same branch may show much less PVT induced skew compared to the same clock signal being supplied by two different branches. A further feature may be that a number of cells (e.g. repeater cells 78 and/or compensation cells 80) on a clock signal path between cells having a closely dependent timing may be small (e.g., no more than 5, or no more than 4, or no more than 3, or no more than 2, or no more than 1, or zero)

Figure 4:
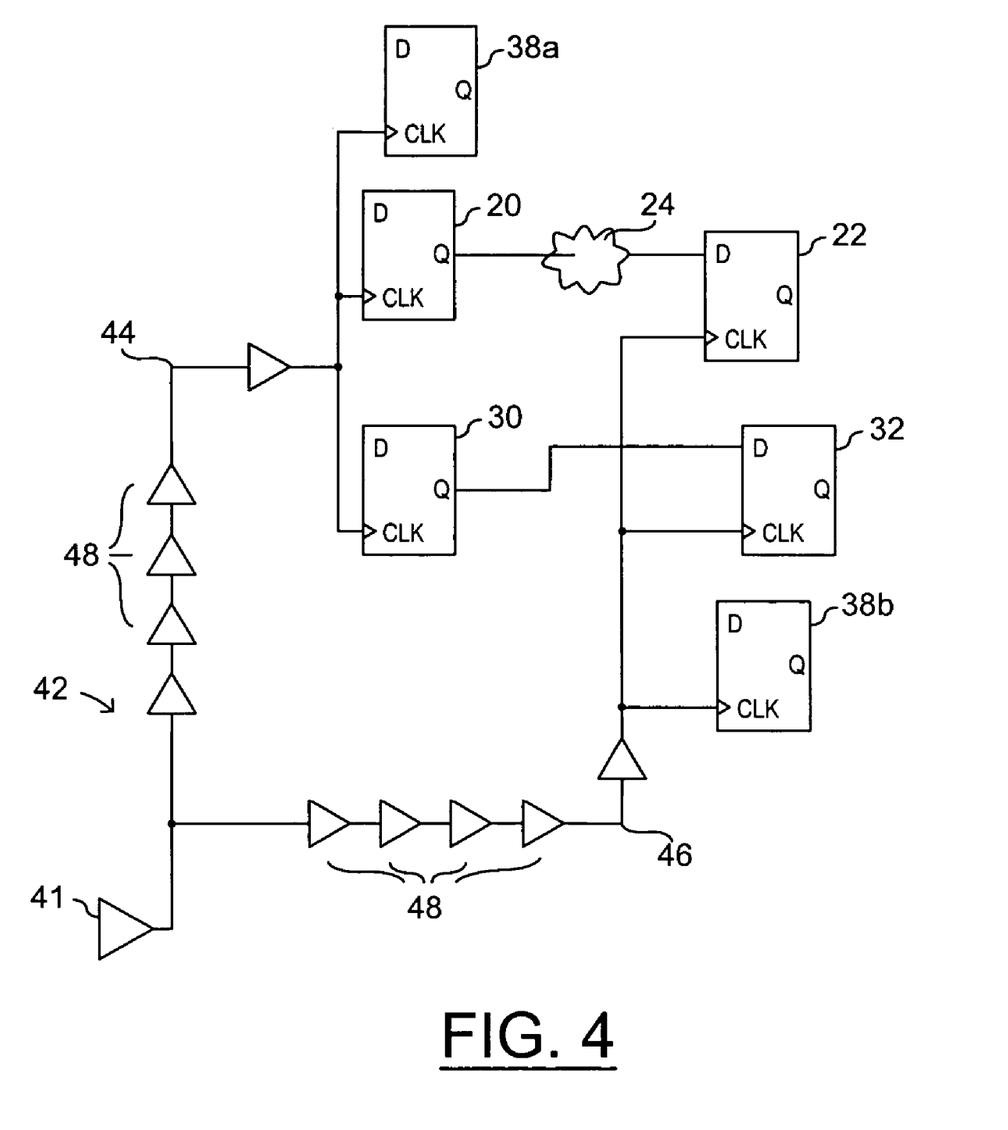
FIG. 4 is a schematic circuit diagram similar to FIG. 2, and including a comparative example of a layout-based clock signal tree.

FIG. 4 may illustrate a comparative example of a clock tree 42 that may be designed for the circuit 10 using only layout-based design techniques (e.g., without taking account of PVT characteristics). The clock tree 42 may include a branch 44 and a branch 46. However, in a layout based clock tree 42, the branches 44 and 46 are designed to supply the clock signal to different local areas of the integrated circuit 12 without taking account of any cell interconnectivity. For example, the branch 44 may supply the clock signal to the first and third locations, especially when these locations are close to each other. The branch 46 may supply the clock signal to the second and fourth locations, especially when these locations are close to each other. Repeater cells 48 may be arranged in the branches 44 and 46 to preserve the clock signal on long signal paths in the branches 44 and 46, in a similar manner to the repeater cells 78. The branches 44 and 46, and the number of repeater cells 48 in each branch, may be designed such that a theoretical signal path length in each branch 46 is the same.

However, the clock tree 42 of FIG. 4 may suffer serious disadvantages compared to the clock tree 72 of FIG. 3. In either Figure, clock skew may be introduced between the clock signals in the branches 70 and 76, or 44 and 46, respectively. The clock skew may be induced by PVT characteristics, which may affect the repeater cells 78 and 48 in each branch differently. With the clock tree of FIG. 4, clock skew between the branches 44 and 46 may cause timing violations between the clocked cell 20 and the downstream clocked cell 22 and/or between the clocked cell 30 and the downstream clocked cell 32. The timing violations may arise because the closely dependent pairs of cells 20 and 22, or 30 and 32, are clocked by different branches of the clock tree 42. In contrast, the clock tree of FIG. 3 may enable the circuit 10 to tolerate clock skew between the branches 70 and 76 without the same vulnerability to timing violations. At least a degree of clock skew may be tolerated because the cells that are closely timing dependent may be driven by the same branch or portion of the clock tree. Clock skew between the branches 70 and 76 may not affect the timing of cells driven by the same branch.

Figure 5:
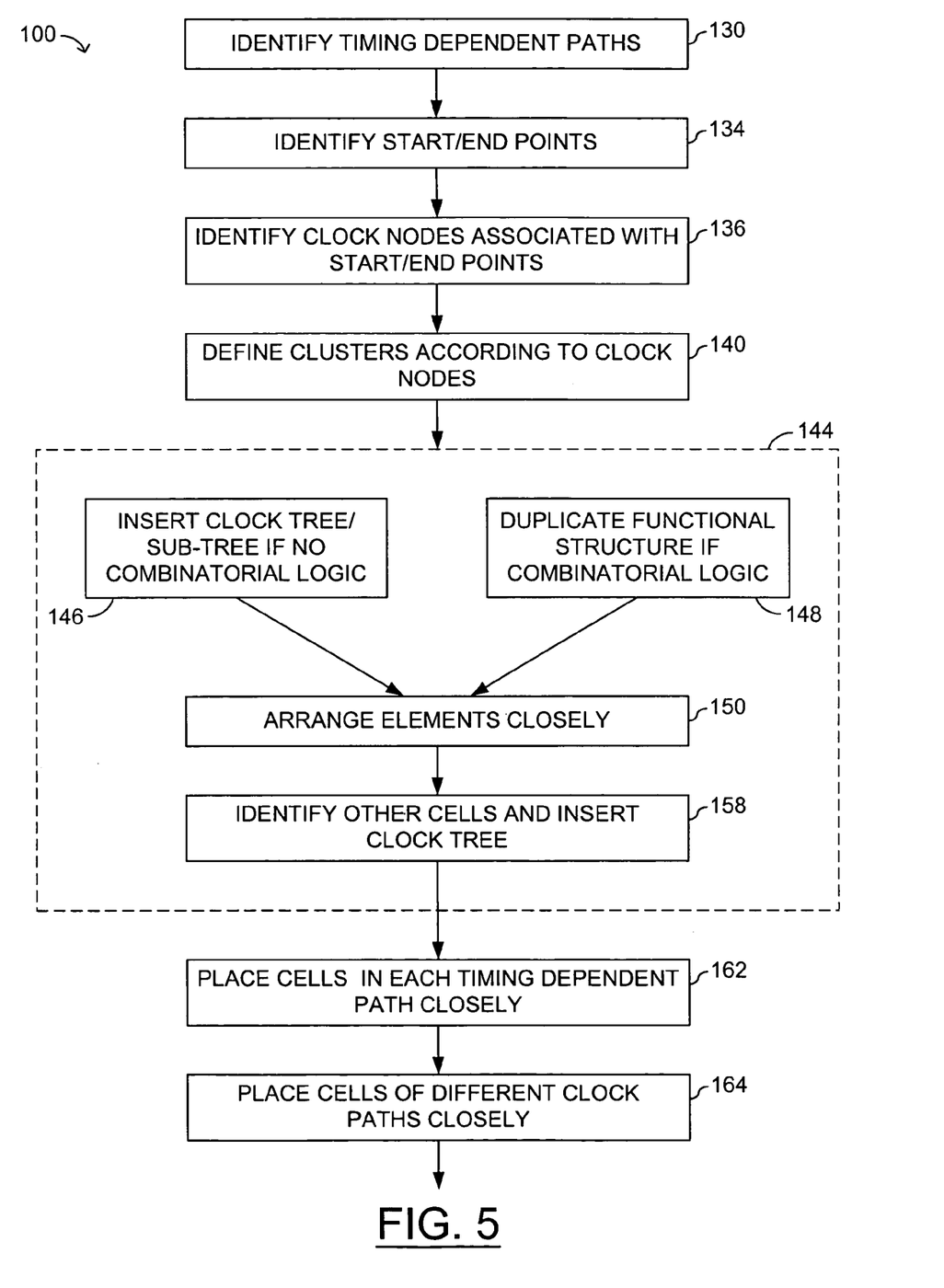
FIG. 5 is a flow diagram showing steps for placing a clock signal supply network using a design tool of another preferred embodiment of the invention.
Figure 6:
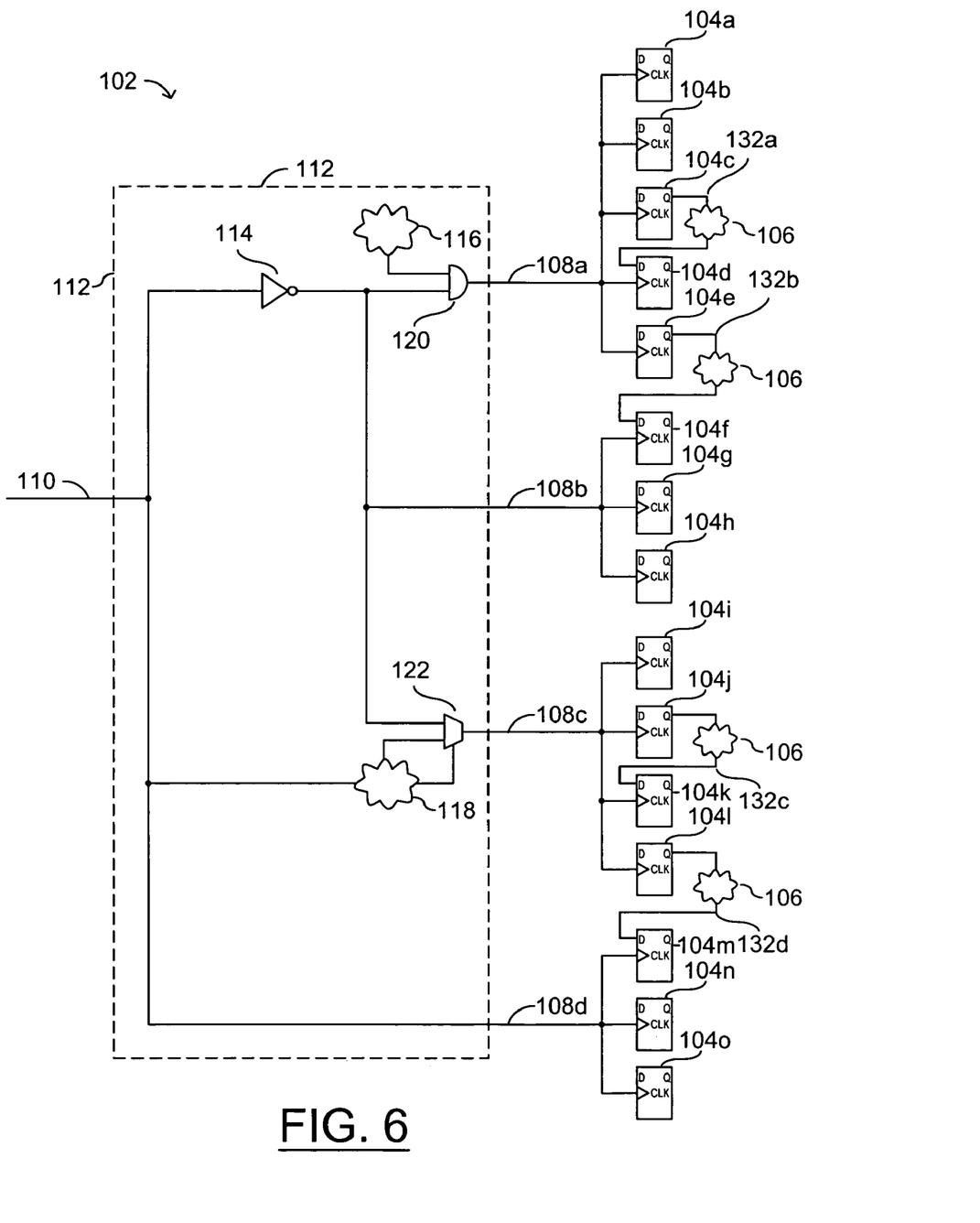
FIG. 6 is a schematic circuit diagram illustrating parts of a design of a second integrated circuit for which a clock tree is to be prepared.
Figure 7:
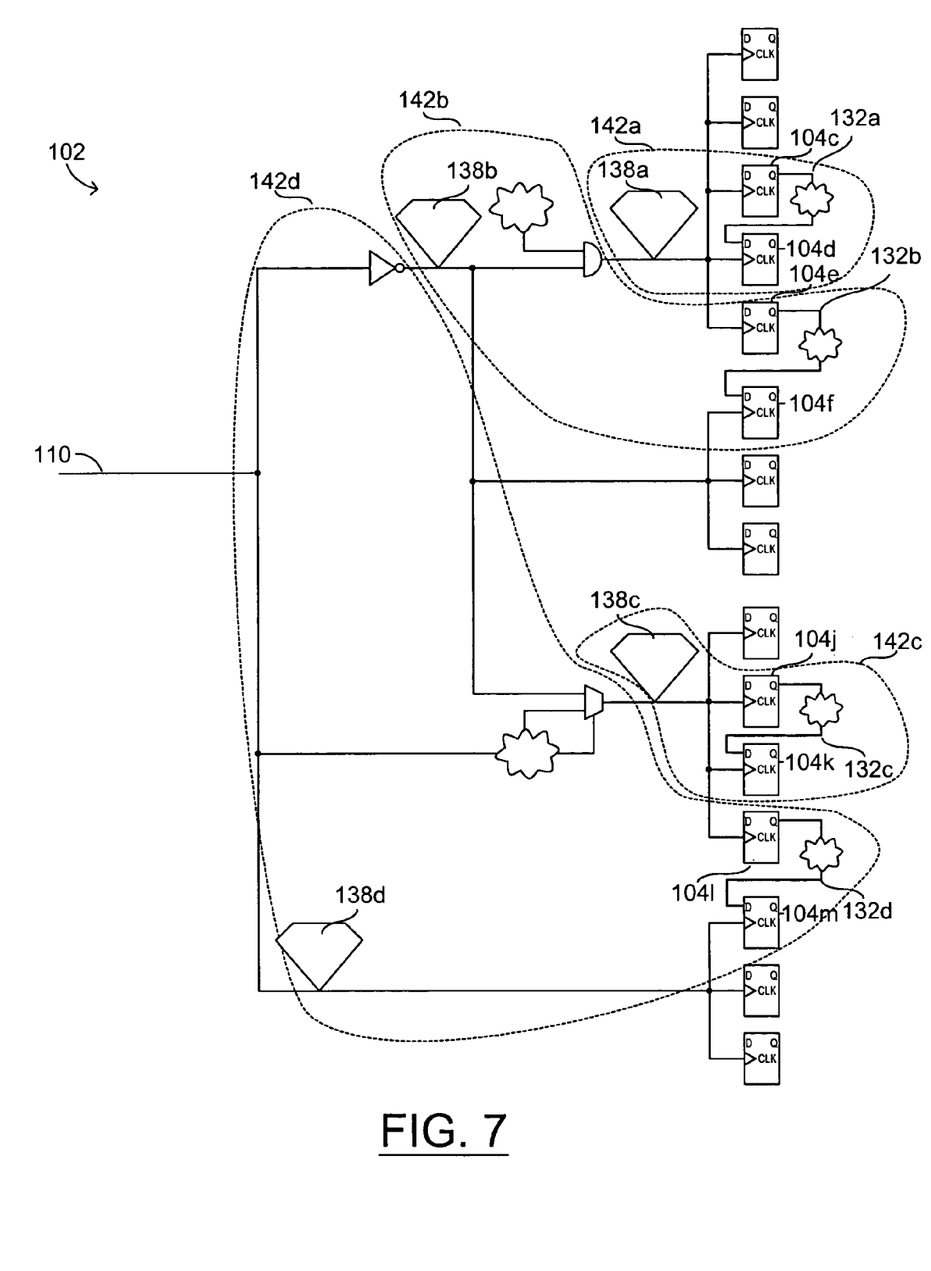
FIG. 7 is a schematic circuit diagram similar to FIG. 6, and showing clock nodes and clusters derived by the design tool of FIG. 5.
Figure 8:
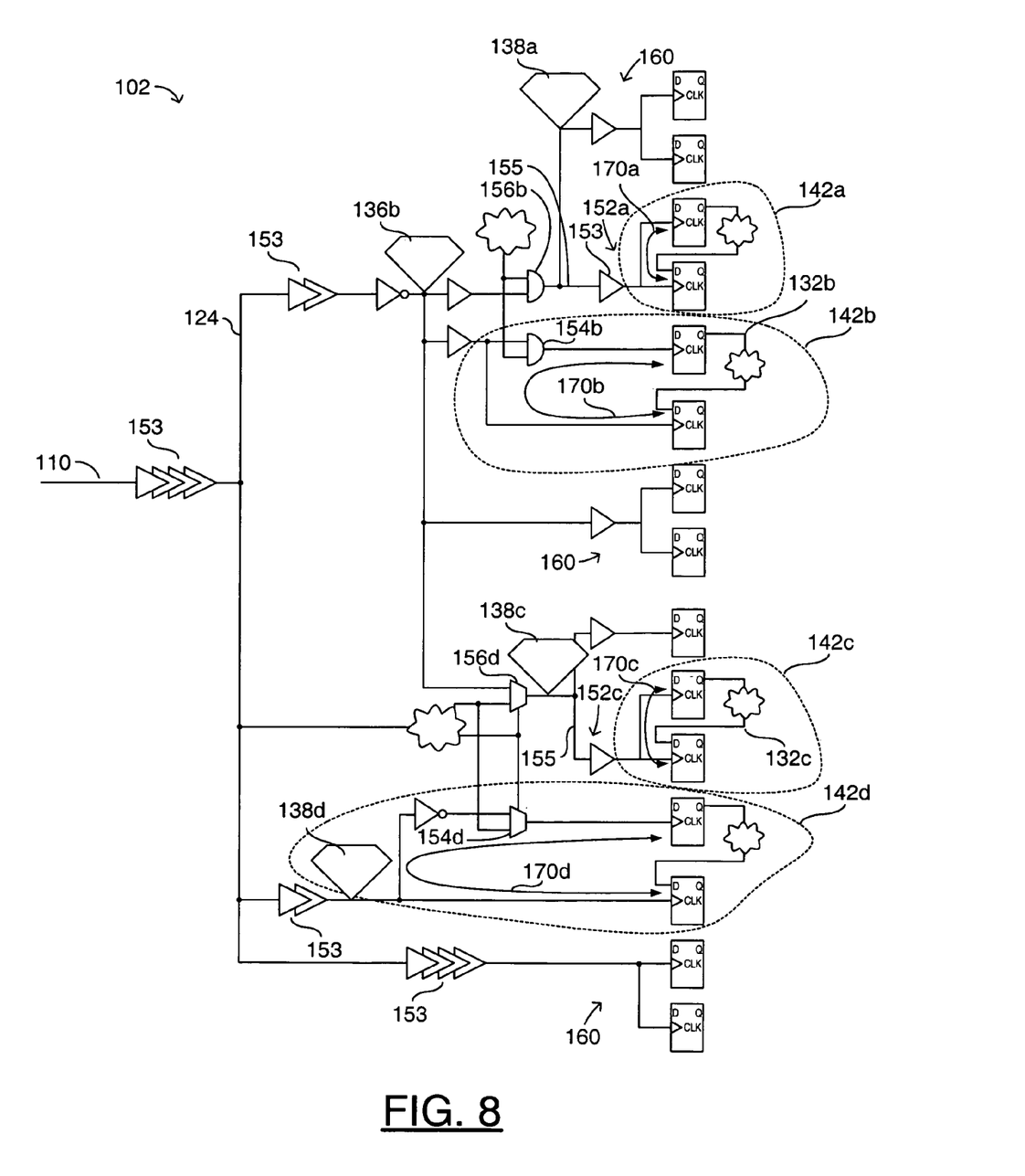
FIG. 8 is a schematic circuit diagram similar to FIG. 6, and including a clock signal supply network generated by the design tool of FIG. 5.

FIG. 5 may illustrate execution steps of a second embodiment of design tool 100 for performing a similar function to the design tool 14. FIGS. 6-8 may illustrate a portion of a circuit 102 to which the design tool 100 may be applied to design and/or place a clock tree. As with the circuit 10, the circuit 102 is merely an example to illustrate the operation of the design tool 100. Other circuits may include different functional circuit cells and/or interconnections according to specific design criteria.

The circuit 102 may, for example, comprise a plurality of clockable circuit cells 104 (e.g., fifteen clockable circuit cells 104a–o). The clockable circuit cells 104 may be any type of cell having an input for receiving a clock signal for controlling a timing of the cell 104. For example, the cells 104 may be flip-flops, latches, memories, etc. One or more of the cells 104 (e.g. a downstream cell 104d, 104f, 104k and 104m) may have an input coupled to receive a signal derived from, or directly or indirectly responsive to, an output of one or more other of the cells 104 (e.g. an upstream cell 104c, 104e, 104j and 104m, respectively). Combinatorial logic 106 may be coupled between one or more of the upstream cells 104c, 104e, 104j and 104l, and the respective downstream cells 104d, 104f, 104k and 104.

Each of the cells 104 may receive one of a plurality of clock signals 108 (e.g., four clock signals 108a–d). The clock signals 108 may be derived from a master clock signal 110 by clock circuitry represented functionally by a circuit block 112. For example, the circuit block 112 may comprise one or more of an inverter 114, logic 116 and 118, a gate 120, and a multiplexer 122, for generating the four different clock signals 108a–d. The circuit block 112 is merely an example to illustrate that a variety of different clock signals 108 may be distributed to different ones of the cells 104.

Referring to FIG. 5, the design tool 100 may be configured to implement the circuit block 112 as a clock tree (124 in FIG. 8). The design tool 100 may be configured to take account of PVT characteristics. The design tool 100 may be configured to design the clock tree 124 taking account of a close timing dependency between certain ones of the cells 104 and/or taking account of a connectivity between certain ones of the cells 104.

The design tool 100 may comprise a step 130 of identifying timing dependent paths in the circuit 102. The step 130 may identify critical and/or closely dependent timing paths in which the timing of one of the cells 104 may be closely dependent on the timing of another of the cells 104. For example, the step 130 may identify timing dependent paths by analyzing the connectivity between the cells 104 and/or by a timing analysis. Additionally or alternatively, a user or designer may identify specific timing dependent paths that may be considered timing critical for achieving a desired operating speed of the circuit 102. The step 130 may, for example, identify four time dependent paths 132 a–d in the circuit 102 associated with the interconnections between the four upstream cells 104c, 104e, 104j and 104l, and the four downstream cells 104d, 104f, 104k and 104m.

At a step 134, an analysis of the time dependent paths 132a–d may be performed to identify the start and/or end points of each time dependent path 132. For example, the step 134 may determine a respective upstream cell and/or a respective downstream cell associated with each time dependent path. For the time dependent path 132a, the step 134 may determine the start point to be the cell 104c, and the end point to be the cell 104d. For the time dependent path 132b, the step 134 may determine the start point to be cell 104e, and the end point to be the cell 104f. For the time dependent path 132c, the step 134 may determine the start point to be the cell 104*j*, and the end point to be the cell 104*k*. For the time dependent path 132*d*, the step 134 may determine the start point to be the cell 104*l*, and the end point to be the cell 104*m*. The cells 104 at the start and/or end points may be referred to as "critical" cells, because carefully timed clock signals may be appropriate to avoid timing violations.

At a step 136, an analysis of the circuit block 112 may be performed. The step 136 may analyze the circuit block 112 to determine, for each time dependent path 132*a–d*, a respective clock node 138*a–d* (FIG. 7). The clock node 138*a–d* may be a node that is common to the start and end points of the respective time dependent path 132*a–d*. Step 136 may perform the analysis by tracking back the clock signals applied to the start and end points of the respective time dependent path 132 to identify the clock node 138.

At a step 140, a respective cluster 142*a–d* (FIG. 7) may be defined for each time dependent path 132*a–d* and/or clock node 138*a–d*. The cluster 142 may include the start and end point cells among the plurality of cells 104. The cluster 142 may include all of the clockable cells 104 that may be associated with the respective time dependent path 132. The cluster 142 may include the respective clock node 138 associated with the respective time dependent path 132.

At a step 144, the clock nodes 138*a–d* and the associated clusters 142 may be processed. The step 144 may process the clock nodes 138*a–d* to assemble the clock tree 124. The step 144 may process the clock nodes 138*a–d* hierarchically. The step 144 may process one or more deepest clock nodes 138*a–d* first. A deepest clock node may be a node that is furthest from the master clock signal 110. For example, in the circuit 102, the clock nodes may be processed in an order of 138*a*, 138*b*, 138*c* and 138*d*. In particular, the clock node 142*a* and/or the clock node 142*c* may be processed before the clock node 138*b*. The step 144 may comprise one or more sub-steps 146, 148, 150 and 158.

The sub-step 146 may be carried out when no combinatorial logic may be configured in the circuit block 112 between the respective clock node 138 and the start and end point cells associated with the respective cluster 142. The sub-step 146 may comprise inserting a clock sub-tree 152 to interconnect the node 138 and the start and end cells. For example, referring to FIG. 8, clock sub-trees 152*a* and 152*c* may be inserted for the clusters 142*a* and 142*c*. The clock sub-trees 152 may include one or more repeater cells 153. The repeater cell(s) 153 may be inserted preferentially in a common (e.g., trunk) portion 155 of the respective sub-tree 152*a* and 152*c*, in preference to a divided (e.g., branch) portion (indicated by arrows 170*a* and 170*c*). Placing the repeater cell(s) 153 in the common portion 155 instead of the divided portions 170*a* and 170*c* may reduce a risk of PVT induced clock skew between the branch portions.

The sub-step 148 may be carried out when combinatorial logic may be configured in the circuit block 112 between the respective clock node 138 and the start and end point cells associated with the respective cluster 142. The sub-step 148 may comprise duplicating a functional structure of the associated portion of the circuit block 112. The functional structure may be duplicated to an extent that no additional buffering may be appropriate. For example, referring to FIG. 8, portions 154*b* and 154*d* duplicating a functional structure of portions 156*b* and 156*d* may be inserted for the clusters 142*b* and 142*d*. The portions 154*b* and 154*d* may duplicate the functional structure of portions of the circuit 112 from which the respective clock signals 108*a* and 108*c* are derived. Duplicating the functional structure may involve additional circuitry overhead. However, the costs of additional circuitry overhead may be significantly outweighed by advantages of reducing PVT induced clock skew. One or more repeater cells 153 may also be included to preserve an integrity of the clock signal in long signal paths.

The sub-step 150 may relate to fine-tuning placement of elements in the clock paths to a respective cluster 142 when the clock paths to the cells in the cluster 142 may differ. For example, clusters 142*b* and 142*d* contain a plurality of clock paths, including a first clock path for the respective start point cell, and a second clock path for the respective end point cell. The step 150 may comprise placing elements on the plural clock paths close to one another. In particular, the portions 154*b* and 154*d* may be located close to the other clock paths in the clusters 142*n* and 142*d*, respectively. Such placement may minimize or at least reduce PVT induced variation between the clock paths.

The sub-step 158 may comprise identifying other cells amongst the plurality of cells 104 that are driven by the respective clock node 138. One or more further clock sub-trees 160 may be inserted for supplying the clock signal from the respective node 138 to those other cells.

A step 162 may be performed for fine-tuning placement of certain ones of the cells 104 to reduce PVT induced variations between the cells 104. The step 162 may comprise placing cells 104 that are in the same respective cluster 142 physically close to one another in the integrated circuit layout.

A step 164 may be performed for fine-tuning placement of the clock tree 124, to further reduce PVT induced variations in the clock signals. The step 164 may be similar to the step 150 described above. The step 164 may relate to elements on plural clock paths for supplying clock signals to closely time dependent cells. The step 164 may comprise placing elements on the plural clock paths close to one another. Such placement may minimize or at least reduce PVT induced variation between the clock paths.

In FIG. 8, arrows 170*a–d* may illustrate respective pairs of the cells 104 between which the clock signal may be optimized to have a low skew, and a low vulnerability to PVT characteristics. The arrows 170*a* and 170*c* may indicate substantially no elements in different clock paths. The arrows 170*b* and 170*d* may indicate clock paths which have different elements, but which are configured to closely match each other, and be located physically close to each other, to minimize PVT effects. The clock paths indicated by the arrows 170*a–d* may generally have a long common trunk and/or short branches and/or may include a low (e.g., minimum) number of elements differing in the clock paths for driving cells in each cluster 142.

Figure 9:
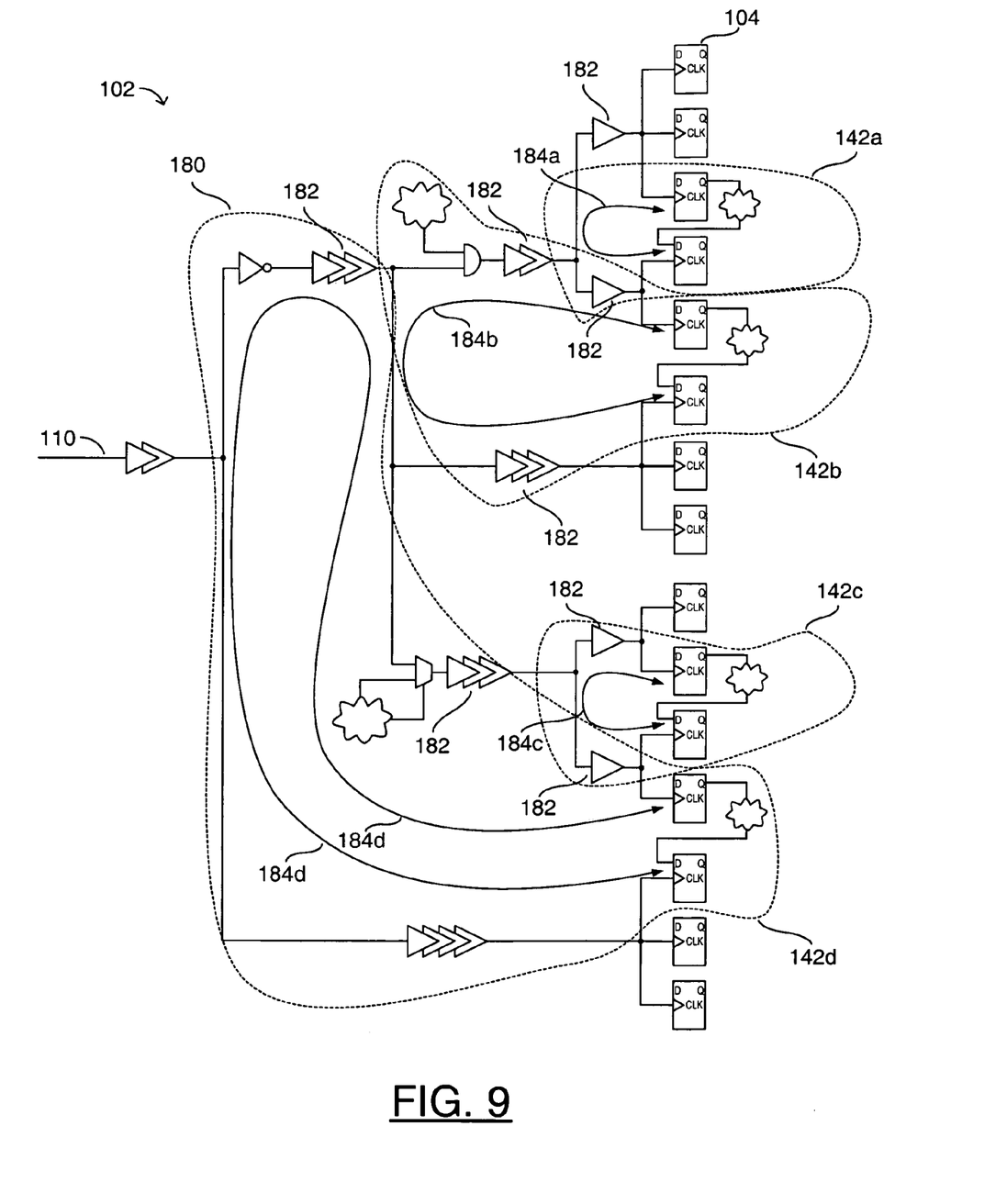
FIG. 9 is a schematic circuit diagram similar to FIG. 6, and including a comparative example of a layout-based clock tree.

FIG. 9 may illustrate a comparative example of a clock tree 180 that may be designed for the circuit 102 using only layout-based design techniques (e.g., without taking account of PVT characteristics). The clock tree 180 may generally resemble the circuit block 112 (of FIG. 6), but with additional repeater cells 182 to distribute the clock signals 108*a–d* across the circuit 102, and to preserve the clock signals 108*a–d* in long signal paths. Arrows 184*a–d* may indicate clock paths for pairs of the cells 104 that are closely time dependent. However, in contrast the clock tree 124 of FIG. 8, the clock tree 180 may be significantly more vulnerable to PVT effects. For example, the arrows 184*a* and 184*c* indicate clock paths that include different repeater cells 182 in the clock paths to the respective cells 104. Such different repeater cells 182 are vulnerable to different PVT effects, and are likely to result in PVT induced clock skew. The arrows 184*b* and 184*d* indicate pairs of clock paths that are significantly different, and extend largely over different branches of the clock 180. Clock paths in different branches are vulnerable to PVT induced clock skew.

The functions performed by the flow diagrams of FIGS. 1 and 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

The present invention may also include a storage medium including a representation of design data of a circuit and/or slice and/or die in accordance with the present invention. The design data may be a representation prior to customization and/or after customization. The design data may include a representation of custom-specific layers and/or custom-independent layers. The design data may be data for fabrication. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the sprit and scope of the invention.

The invention claimed is:

1. A method of placing a clock signal supply network in a design representation for an integrated circuit, the design representation comprising a plurality of clockable circuit cells, and the method comprising the steps of:
    (a) identifying a first of said clockable circuit cells configured to receive a first of a plurality of respective clock signals controllable by a first combinatorial logic of said clock signal supply network;
    (b) identifying a second of said clockable circuit cells configured to receive a second of said respective clock signals, said second clockable circuit cell having a clock timing dependent relation relative to said first clockable circuit cell that defines a cell cluster; and
    (c) duplicating said first combinatorial logic to create a second combinatorial logic of said clock signal supply network within said cell cluster to supply said second respective clock signal to said second clockable circuit cell.

2. The method of claim 1, wherein said design representation comprises a first location for said first clockable circuit cell and a second location for said second clockable circuit cell, said second location being non-adjacent to said first location.

3. The method of claim 1, further comprising the step of:
    inserting in said clock supply network a common portion coupled to said first combinatorial logic and said second combinatorial logic.

4. The method of claim 3, wherein said cell cluster comprises no repeater cells.

5. The method of claim 1, wherein said respective clock signals comprise a common clock signal for said first clockable circuit cell and said second clockable circuit cell.

6. The method of claim 1, wherein said second clockable circuit cell is configured to receive a signal from an output of said first clockable circuit cell.

7. The method of claim 1, further comprising the step of:
    routing a first clock supply path for said first clockable circuit cell and a second clock supply path for said second clockable cell in a closely adjacent relationship.

8. The method of claim 1, wherein step (a) comprises the sub-steps of:
    identifying at least one signal path that passes through plural ones of said plurality of clockable circuit cells;
    identifying said first clockable circuit cell at a first end of said signal path; and
    identifying said second clockable circuit cell at a second end of said signal path.

9. The method of claim 8, further comprising the step of:
    identifying a particular clock node of a plurality of clock nodes in said clock signal supply network, wherein said particular clock node (i) represents a common source from which said respective clock signals for said first clockable circuit cell and said second clockable circuit cell are derived and (ii) is closest among said clock nodes to said first clockable circuit cell and said second clockable circuit cell.

10. The method according to claim 1, further comprising the step of:
    routing said respective clock signals such that a timing difference between said respective clock signals is protected from process, voltage and temperature (PVT) influences.

11. The method according to claim 1, further comprising the step of:
    allocating a third of said clockable circuit cells to said first cell cluster, said third clockable circuit cell lacking said clock timing dependent relation relative to said first clockable circuit cell.

12. A computer based design tool for placing a clock signal supply network in a design representation for an integrated circuit, the design representation comprising a plurality of clockable circuit cells, and the tool being configured to:
    (a) identify a first of said clockable circuit cells configured to receive a first of a plurality of respective clock signals controllable by a first combinatorial logic of said clock signal supply network;
    (b) identify a second of said clockable circuit cells configured to receive a second of said respective clock signals, said second clockable circuit cell having a clock timing dependent relation relative to said first clockable circuit cell that defines a cell cluster; and
    (c) duplicate said first combinatorial logic to create a second combinatorial logic of said clock signal supply network within said cell cluster to supply said second respective clock signal to said second clockable circuit cell.

13. The tool of claim 12, wherein said tool is further configured to:
   insert in said clock supply network a common portion coupled to said first combinatorial logic and said second combinatorial logic.

14. The tool of claim 12, wherein said tool is further configured to:
   route a first clock supply path for said first clockable circuit cell and a second clock supply path for said second clockable cell in a closely adjacent relationship.

15. An integrated circuit comprising:
   a plurality of clockable circuit cells including (i) a first clockable circuit cell within a first cell cluster and (ii) both a second clockable circuit cell and a third clockable circuit cell within a second cell cluster, said third clockable circuit cell having a clock timing dependent relation relative to said second clockable circuit cell; and
   a clock supply network for supplying a plurality of respective clock signals to said clockable circuit cells, said clock supply network comprises (i) a first combinatorial logic configured to controllably supply a first of said respective clock signals to said first clockable circuit cell, (ii) a second combinatorial logic within said second cluster to controllably supply a second of said respective clock signals to said second clockable circuit cell, wherein said second combinatorial logic duplicates said first combinatorial logic and (iii) a design such that a timing difference between said respective clock signals is protected from process, voltage and temperature (PVT) influences.

16. The integrated circuit of claim 15, wherein said second clockable circuit cell and said third clockable circuit cell are located at non-adjacent locations.

17. The integrated circuit of claim 15, wherein said clock supply network further comprises a common portion coupled to said first combinatorial logic and said second combinatorial logic.

18. The integrated circuit of claim 15, wherein said clock supply network further comprises a first clock signal path and a second clock signal path for supplying said respective clock signals to said second clockable circuit cell and said third clockable circuit cell, said first signal path and said second signal path being routed to be closely adjacent each other.

19. The integrated circuit according to claim 15, wherein said first combinatorial logic comprises a clock gate.

20. The integrated circuit according to claim 15, wherein said first combinatorial logic comprises a clock multiplexer.

* * * * *